Aug. 31, 1926.
H. PILOTY
1,597,818
ART OF MULTIPLE COLOR PHOTOGRAPHY
Filed Nov. 21, 1925
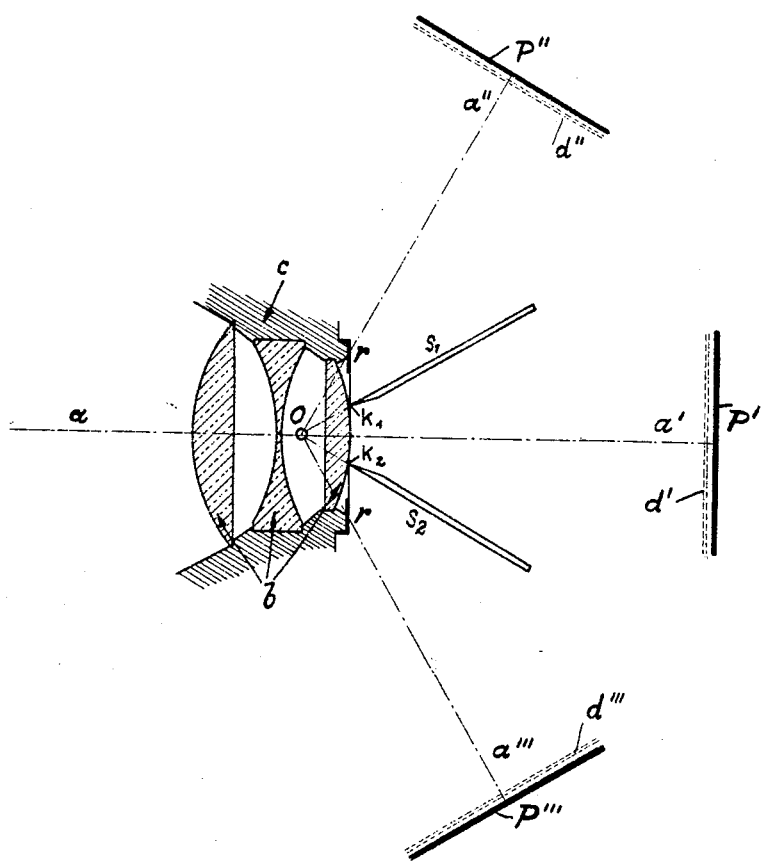
Inventor:
H. Piloty Patented Aug. 31, 1926.

1,597,818

UNITED STATES PATENT OFFICE.

HANS PILOTY, OF BERLIN-WILMERSDORF, GERMANY, ASSIGNOR TO JOS-PE FARBEN-PHOTO GESELLSCHAFT MIT BESCHRANKTER HAFTUNG, OF HAMBURG, GERMANY.

ART OF MULTIPLE-COLOR PHOTOGRAPHY.

Application filed November 21, 1925, Serial No. 70,692, and in Germany November 26, 1924.

In the prior specification Ser. No. 742,932 there is described a device for the simultaneous production of partial pictures in multiple color photography by dividing by optical means the pencil of rays traversing an objective or lens system, in which there is provided in conjunction with suitable mirrors an objective of which only the exit pupil acts as a boundary to the rays within the angle containing the picture.

The object of the present invention is to embody in such a device an arrangement of light-splitting mirrors known per se, of which the edges forming boundaries to the rays are parallel to the line of intersection of the mirror planes, the whole being so contrived that asymmetrical ditribution of the illumination on the several plates, and the formation of colored zones, will be avoided with greater certainty than when there is employed only the arrangement described in the prior specification. This object is realized according to the invention by reason that the exit pupil which acts as a boundary for the pencil is constituted by an annular mask the plane of which coincides exactly with the plane containing the mirror edges which serve as boundaries for the rays.

The figure of the accompanying drawing shows by way of example a construction according to the invention.

The figure shows diagrammatically an objective or lens system of which only the exit pupil acts as a boundary for the rays within the angle containing the picture. $a$, $a'$ denotes the optical axis of the objective or lens system consisting of lenses $b$ fitted to a mount $c$. In conjunction with such lens system there is provided a mirror system consisting of two mirrors $s^1$ and $s^2$ the planes of which intersect in a line perpendicular to the axis and containing the point O. $a^{11}$ and $a^{111}$ represent the reflections of the optical axis in the two lateral partial pictures. The three plates $P^1$, $P^{11}$, and $P^{111}$ are located at the positions shown behind suitable filters $d^1$, $d^{11}$, $d^{111}$.

The mirror system has two edges $k^1$, $k^2$, which serve as boundaries for the rays, which are perpendicular to the plane of the drawing and parallel to the line of intersection of the mirror planes, and by which the exit pupil is divided into three parts. Theory and experiment establish that great importance attaches to the position of the exit pupil, which alone acts as a boundary to the rays within the angle presented by the picture, relatively to the mirror edges $k^1$, $k^2$, it being found that the exit pupil must be exactly in the plane defined by the mirror edges $k^1$, $k^2$, as otherwise—and very slight departure suffices—there is asymmetric distribution of the light on the plates $p^{11}$ and $p^{111}$, that is, the light does not impinge radially symmetrically on these two plates, as in an ordinary photograph, from the centre towards the sides, but is incident in different directions in variable measure so that undesirable colored zones are presented in colored pictures produced from partial pictures obtained in this way.

According to the invention the required exact position is given to the exit pupil by the attachment of an annular mask $r$ in such wise that the plane of the mask coincides with the plane containing the mirror edges $k^1$, $k^2$. If this position is adhered to precisely, there is obtained closer approximation to uniformity of the distribution of the illumination than with the adoption of the arrangement described in the prior specification.

I claim:—

Means for the production of colored record images in color photography, comprising in combination, a lens system including an outer lens and an inner lens of smaller diameter than the outer lens, a mount for the lens system, the mount including an annular mask forming an exit pupil which alone determines the boundary of the rays within the angle containing a picture, and a dividing mirror system including a plurality of mirrors positioned behind the lens system and having parallel edges located in the plane of the mask, said means being positioned to serve as boundaries for the rays, the planes of the mirrors intersecting the optical axis of the lens system at a point within the lens system.

In testimony whereof I have signed my name to this specification.

HANS PILOTY.